United States Patent [19]

Senda et al.

[11] 4,402,494
[45] Sep. 6, 1983

[54] PROCESS OF HEAT TREATING COPPER FILM ON CERAMIC BODY AND HEAT TREATING APPARATUS THEREFOR

[75] Inventors: Atsuo Senda, Ootsu; Tohru Kasanami; Takuji Nakagawa, both of Kyoto, all of Japan

[73] Assignee: Murata Manufacturing Co., Ltd., Japan

[21] Appl. No.: 194,983

[22] Filed: Oct. 8, 1980

[51] Int. Cl.³ .............................................. C21D 1/06
[52] U.S. Cl. .................................... 266/255; 266/250; 266/251; 432/253
[58] Field of Search ............... 266/250, 251, 252, 255, 266/262, 263, 264; 432/253, 254.1, 254.2, 262

[56] References Cited

U.S. PATENT DOCUMENTS

| | | | |
|---|---|---|---|
| 1,270,519 | 6/1918 | Henderson | 266/262 |
| 1,824,747 | 9/1931 | Coriolis | 432/254.2 |
| 3,183,130 | 5/1965 | Reynolds et al. | 266/255 |
| 4,147,506 | 4/1979 | Southern et al. | 266/262 |
| 4,165,868 | 8/1979 | Southern | 266/264 |
| 4,223,877 | 9/1980 | Sanderson | 266/262 |

*Primary Examiner*—John P. Sheehan
*Attorney, Agent, or Firm*—Ostrolenk, Faber, Gerb & Soffen

[57] ABSTRACT

A process for metallizing a copper film comprising the step of heat treating a copper film formed by an electroless plating process as opposing electrodes of a ceramic capacitor. The process comprises the steps of placing a ceramic body having a copper film formed on the surface thereof by an electroless plating process within a container sealing the same from the external atmosphere and maintaining constant the internal atmosphere, and heating the container maintaining the surrounding of the container in an inert atmosphere.

7 Claims, 9 Drawing Figures

PROCESS OF HEAT TREATING COPPER FILM ON CERAMIC BODY AND HEAT TREATING APPARATUS THEREFOR

BACKGROUND OF THE INVENTION

1. Field of the Invention

The present invention relates to a process and apparatus for heat treating a copper film formed on a ceramic body. More specifically, the present invention relates to a process and apparatus for heat treatment of a copper film formed as an electrode or a conductive device in a ceramic electric circuit component including a ceramic body of such as a dielectric, insulating, resistive, semiconductive or the like material.

2. Description of the Prior Art

One example of a ceramic electric circuit component of interest to the present invention is a ceramic capacitor. The electrode of a ceramic capacitor is generally formed using silver of high conductivity. Such silver electrode is formed by coating a silver paste on a ceramic body and by baking the same. However, with the recent rise of the cost of silver material, the ratio of the cost of such silver electrode to the total cost of a ceramic capacitor has increased. Thus, employment of such silver electrode has become a cause of the rise of the total cost of ceramic capacitors.

As a result of the foregoing, attempts have been made to development of an inexpensive electrode. As one approach, various studies were made as to a method for forming a metallic film, such as an electroless plating process, a vacuum evaporation process, a sputtering process, an ion plating process, and the like. As another approach, study was made as to employment of inexpensive metal as a substitute for silver as an electrode.

The first approach employed was a nickel plated electrode formed by means of an electroless plating process. A nickle plated electrode was successful to some extent as an inexpensive electrode substitute for a silver electrode. However, it was observed that employment of a nickel plated electrode as an electrode of ceramic capacitors involves the following problems. More specifically, the resistivity of a nickel electrode per se is $7.24 \times 10^{-6} \Omega.cm$, which is higher than that of silver being $1.62 \times 10^{-6} \Omega.cm$. Accordingly, a problem is caused that a frequency characteristic is degraded in the high frequency region. Another problem is that solderability of a nickel plated electrode is poor. Furthermore, another approach was attempted in which the whole surface was coated with a solder layer in order to decrease the resistivity of the nickel plated electrode. However, in coating the whole surface of the electrode with a solder layer a large amount of flux which is active must be used. Accordingly, it is necessary to cleanse the electrode to remove unnecessary flux after soldering. Furthermore, although the electrode portion is soldered by dipping the same in a solder tub, for example, such a process causes stress in the ceramics, so that a crack is liable to be caused in the ceramics.

As a further approach, attempts were made to develop an inexpensive electrode which can be substituted for the above described nickel electrode. A copper plated electrode applied by means of a copper electroless plating process was tried. However, it was observed that a serious obstacle is involved in a copper electroless plated electrode. Particularly, a copper plated electrode formed by an electroless plating process has a large resistivity as compared with that of an electrode formed from a bulk of copper. A similar phenomenon was also observed when a copper electrode was formed by a vacuum evaporation process, a sputtering process, an ion plating process and the like as well as when a copper electrode was formed by an electroless plating process. Accordingly, a copper film formed by the above described various processes requires additional process to exhibit the characteristics of a copper bulk by achieving metallization, dense formation, enhancement of adhesiveness and stabilization. Usually, heat treating is employed to that end.

However, the copper film reacts very actively with oxygen on the occasion of heat treatment, so that the film is oxidized even with a slight amount of oxygen. As a result, a blue oxide film is quickly formed on the surface of the copper film. Conventionally, it was necessary to fully remove oxygen from a heat treating furnace (such as the oxygen absorbed on the furnace wall of the heat treating furnace) using a large amount of nitrogen for a long period of time before carrying out heat treatment of a copper film. In addition, it was necessary to pay careful attention to ensure that an oxygen gas is not be mixed in an ambient gas. The present invention can eliminate the above described problems.

SUMMARY OF THE INVENTION

Briefly described, the present invention comprises the step of raising the heat of a ceramic body having a copper film formed on the surface thereof, with the ceramic body placed in a container. The container comprises means for defining a chamber for placement of the ceramic body, which seals the chamber from the external atmosphere, to thereby maintain constant the internal atmosphere of the chamber. Heating of the ceramic body is carried out through the container by maintaining the outside of the container in an inert atmosphere. At the heat rising step, the gas inside the container is exhausted and a sort of evacuated condition free from oxygen is accomplished.

In a preferred embodiment of the present invention, the heat treatment is carried out at the temperature of 300° to 1000° C. and preferably at the temperature of 500° to 1000° C. The ceramic body placed in the chamber of the container is selected to be of 50 to 100 vol % with respect to the volume of the chamber of the container.

In brief, the inventive apparatus comprises:

a container having a sealed chamber formed therein for receiving at least one ceramic body;

a furnace having an open space for receiving at least one said container;

means for supplying an inert gas to said open space externally of said container whereby a generally inert atmosphere is defined in said open space;

a valve associated with said container for permitting gases located inside said chamber to flow from said chamber into said space whenever the pressure of said gases in said chamber rise above the pressure of said atmosphere in said space by an amount determined by the structure of said valve;

said furnace including a heater for heating said atmosphere in said space and thereby heating both said gases located in said chamber of said container and any cermiac bodies located in said chamber; and said container and said furnace being so structured that as said atmosphere in said space and said gases in said chamber are heated by said heater, the pressure of said gases in said chamber becomes greater than the pressure of said atmosphere in said space, said heater generating sufficient heat to cause the pressure of said gases in said chamber to rise above the pressure of said atmosphere by at least said amount whereby gases located in said chamber flow outside said chamber into said space and said any ceramic bodies located in said chamber are heat treated without being exposed to said inert gas.

In a preferred embodiment of the present invention, the container comprises a container body having an opening and a lid being fitted to the peripheral portion of the opening for closing the opening. The fitting portion of the container body and the lid is structured to form a gap allowing for evacuation of the internal gas of the container.

In another preferred embodiment of the present invention, the fittting portion of the container body and the lid is structured to keep a gas tight state and the container is provided with a valve allowing for passage of the gas only in one direction from the inside to the outside of the container.

The container is made of a material such as stainless steel, iron, copper, alumina, zirconia, forsterite, quartz glass, glass ceramics, mullite, or cordierite, which will not exert adverse influence on the ceramic body and the copper film on the occasion of heat treatment. The furnace is structured as a tunnel type continuous heating furnace or a batch furnace.

Accordingly, a principal object of the present invention is to provide a process and apparatus for heat treating a copper film formed on a surface of a ceramic body to turn to be of metal copper close to pure copper.

Another object of the present invention is to provide a process and apparatus for heat treatment for improving the electrical characteristic of a copper film formed as an electrode or a conductive device in a ceramic electric circuit component including a ceramic body.

A further object of the present invention is to provide a process and apparatus for enhancing adhesion to a ceramic body of a copper film formed on the surface of a ceramic body.

Still a further object of the present invention is to provide a ceramic electric circuit component including a ceramic body and having a copper film formed on the ceramic body, whose electric characteristic and adhesion to the ceramic body have been improved.

These objects and other objects, features, aspects and advantages of the present invention will become more apparent from the following detailed description of the present invention when taken in conjunction with the accompanying drawings.

DESCRIPTION OF THE PREFERRED EMBODIMENTS

An outline of the preferred embodiment of the inventive heat treating process will be generally described. At the outset, a ceramic body of such as a dielectric, insulating, resistive, semiconductive or the like material is prepared. Then a copper film is formed on the surface of the ceramic body by means of a thin film forming technology such as an electroless plating process, a vacuum evaporation process, a sputtering process, an ion plating process or the like. By employing dielectric ceramics as a ceramic body and by forming a copper film on the surface thereof, a capacitor is formed. By employing ceramics such as alumina, zirconia, forsterite, or the like as a ceramic body and by forming a circuit pattern of a copper film on the surface thereof, a circuit board is formed. Additionally, by forming a copper film on the surface of a ceramic body of such as a resistive, semiconductive or the like material, various kinds of electronic components may be formed.

Various kinds of electronic components including copper films formed on the surface of ceramic bodies by means of various processes are then subjected to a heat treatment process at a temperature of approximately 700° C. in an inert atmosphere such so nitrogen. The copper film as heat treated has been metallized and exhibits a strong adhesiveness and enhanced electric characteristic, thus exhibits a very preferred characteristic.

Figure 1:
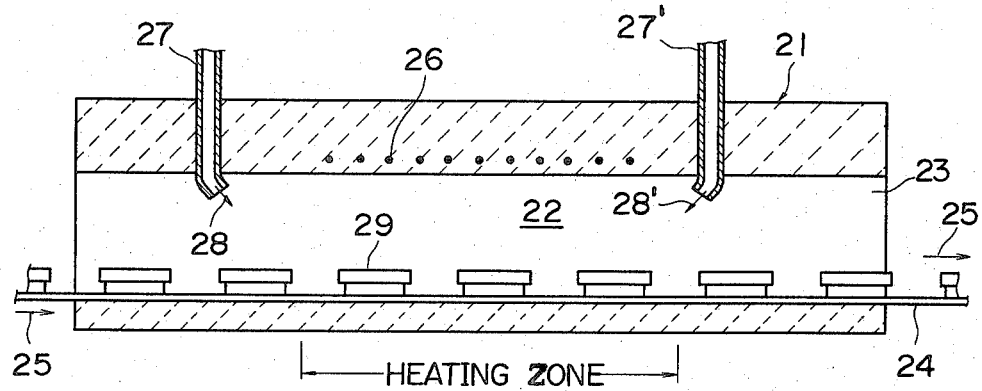
FIG. 1 is a vertical sectional view showing one embodiment of the inventive heating apparatus of the present invention including a tunnel type continuous heating furnace.

FIG. 1 shows one embodiment of the inventive heat treating apparatus of the present invention. Referring to FIG. 1, a furnace body 21 is formed in a tunnel type. An internal space 22 of the furnace body 21 is defined by a cylindrical inner wall surface 23. A conveyor 24 is provided in parallel with the wall surface at a relatively low portion of the inner wall surface 23. The conveyor 24 is driven intermittently or very slowly in the direction of arrow 25. A heater 26 is provided as distributed at an approximate middle portion of the furnace body 21 in the longitudinal direction. A heating zone is formed by the heater 26 extending in the longitudinal direction of the furnace body 21 at the approximate centeral portion of the internal space 22. Two pipes 27, 27' are provided to provide gas supply ports at opposite ends of the heating zone in the longitudinal direction of the furnace body 21. The pipes 27, 27' are positioned relatively upward of the inner wall surface 23. The pipes 27, 27'are provided to extend through the wall surface of the furnace body 21, so that the end of each pipe communicates with the internal space 22. The end portions of the two pipes 27, 27' jutting inside the internal space 22 are bent toward the central portion of the internal space 22. An inert gas is supplied from an inert gas supply source, not shown, through the respective pipes 27, 27' whereby the direction of inert gas is jetted in the arrows 28, 28'. Due to a jetting supply of the inert gas from these pipes 27, 27' an atmosphere of the inert gas or an atmosphere substantially including the inert gas is established in the heating zone.

Figure 2:
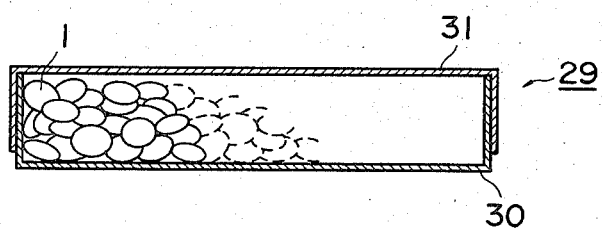
FIG. 2 is a sectional view of a container for placement of a ceramic body for use with the heating furnace of FIG. 1.

A plurality of containers 29 are placed as distributed equispaced on the conveyor 24 in the longitudinal direction of the furnace body 21. Referring to FIG. 2, the container 29 comprises a container body 30 having an opening at the upper end, and a lid 31 for closing the opening of the container body 30. The overlapping portion of the lid 31 and the body 30 define a valve which normally seals the inside chamber from the external atmosphere but which permits gases inside the chamber to flow outside the container when the pressure of the gases inside the chamber rise above the pressure of the external atmosphere by an amount determined by the structure of the container 29. The container body 30 and the lid 31 are made of a material such as stainless steel, iron, copper alumina, zirconia, forsterite, quartz glass, glass ceramics, mullite, or cordiierite. The container 29 is structured to seal the inside chamber from the external atmosphere, thereby to maintain the internal atmosphere constant.

One embodiment of the inventive process of the present invention is carried out as set forth in the following. At the outset, ceramic bodies each having a copper film formed on the surface thereof by an electroless plating process, for example, are prepared. Then, as shown in FIG. 2, the ceramic bodies 1 having the copper film formed on the surface thereof are placed in the container body 30. After the ceramic bodies 1 are placed inside the container body 30, the lid 31 is fitted to the container body 30. It has been observed that a plurality of ceramic bodies 1 may be preferably placed so that the heat treatment effect may be enhanced. If feasible, in placing the ceramic bodies 1 in the container 29 the percentage by volume is selected such that the ceramic bodies 1 may be of 50 to 100 vol % with respect to the volume of the space inside the container 29. Preferably the plurality of ceramic bodies 1 are placed at randomly in the container 29 rather than placed in an orderly manner. The reason is presumably that a gap formed between the plurality of ceramic bodies 1 serve to make smooth a flow of the gas therethrough. The container 29 having the plurality of ceramic bodies 1 housed is then placed equispaced on the conveyor 24, as shown in FIG. 1.

Referring to FIG. 1, the heater 26 is adjusted to a temperature which will heat the containers 29 located in the heating zone at a temperature range of 300° to 1000° C. Preferably, the temperature range for heating the containers is selected to be 500° to 1000° C. Furthermore, an inert gas such as nitrogen, carbon monoxide, hydrogen and the like is supplied to the heating zone. As a result, an inert atmosphere is established at the heating zone.

The containers 29 conveyed in the direction of arrow 25 by the conveyor 24 are gradually heated as they reach the heating zone. As a result, the air located inside the containers 29 is discharged outside the containers due to volume expansion of the air inside the containers. At the same time, oxygen as absorbed and adsorbed remaining on the copper film on the ceramic body 1 is also discharged. Accordingly, the inside of the container 29 becomes a kind of vacuum state having an extremely low oxygen partial pressure. Such state is suited for changing the copper film into pure copper. Then the container 29 is brought to the heating zone. Being conveyed to the heating zone, the container 29 is heated to the set maximum temperature. The time period when the maximum temperature is maintained is selected to be say approximately 10 minutes. In such a state, the atmosphere gas existing in the internal space 22 rarely flows inside the container 29. Thus, the copper film on the surface of the ceramic body 1 changes to a state close to metal copper, whereby a copper film of an enhanced conductivity and luster is obtained. The flow rate of the inert gas being supplied to the heating zone need not be specifically determined and it has been observed that a relatively small and relatively large flow rate make little difference in effect. The container 29 passing through the heating zone is then gradually cooled.

Figure 3:
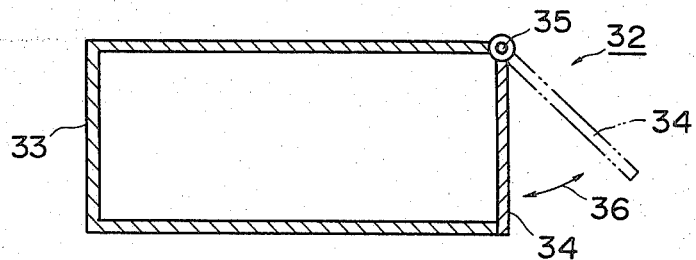
FIG. 3 is a sectional view showing a first modification of the container of FIG. 2.

FIG. 3 is a modification of the container which may be used in place of the FIG. 2 container 29. The container 32 shown in FIG. 3 comprises a container body 33 having an opening at the side surface and a lid 34 for closing the opening of the container body 33. The lid 34 is swingingly coupled to the container body 33 by means of a hinge 35, so that lid 34 hinge may be rotated in the direction of the arrow 36. Thus, the lid 34 can be opened as shown by a phantom line in FIG. 3. The container body 33 and the lid 34 are also made of the same material as that of the previously described container 29.

Figure 4:
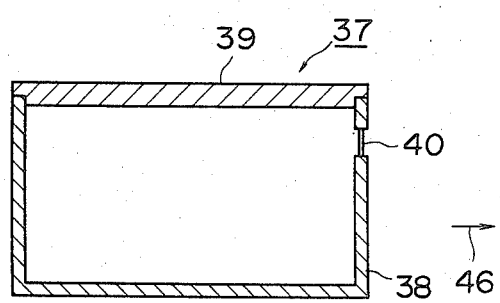
FIG. 4 is a sectional view showing a second modification of the container of FIG. 2.

FIG. 4 is a further modification of the FIG. 2 container 29. The container 37 shown in FIG. 4 comprises a container body 38 and a lid 39. The lid 39 is adapted to be fitted to an opening at the upper surface of the container body 38, so that the opening may be closed by the lid 39. A one-way valve 40 is provided at a suitable portion of the wall surface of the container 37, such as a portion of the side surface of the container body 38. Although the one-way valve 40 is not illustrated in detail, any type of wellknown one-way valve may be utilized. The one way of nonreturn valve 40 is structured to allow for passage of the gas only in one direction from the inside to the outside of the container 37.

The containers shown in FIG. 3 and FIG. 4 serve the same function as that of the container 29 of FIG. 2. More specifically, the air remaining inside the container is discharged outside of the container due to volume expansion but the outside gas is prevented from flowing into the container.

Figure 5:
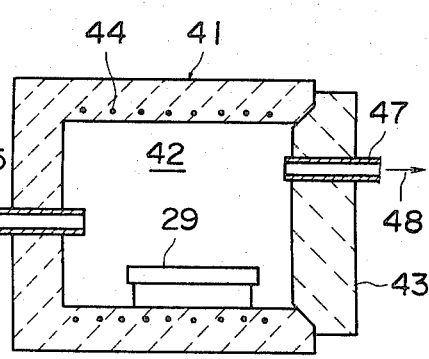
FIG. 5 is a vertical sectional view showing another embodiment of the inventive heating apparatus including a batch furnace as another example of the heating furnace.

FIG. 5 shows a modification of the heating furnace. The FIG. 5 heating furnace comprises a batch furnace. The batch furnace comprises a furnace body 41. The furnace body 41 defines a space 42 and comprises an opening along one side surface. The opening is closed by a door 43. The furnace body 41 is provided with a heater 44. A pipe 45 is provided extending through the wall surface of the furnace body 41. The pipe 45 serves to define a supply port for supplying an inert gas into the sapce 42, as shown by the arrow 46. Another pipe 47 is provided extending through the wall surface of the door 43. The pipe 47 serves to discharge the gas inside the space 42 in the arrow 48 direction in accordance with the quantity of gas supplied through the pipe 45. The container 29 is placed within the space 42 defined by the furnace body 41. Thus, the container 29 is heated within the inert atmosphere and accordingly, as in the case of the tunnel type continuous heating furnace of FIG. 1, the copper film on the surface of the ceramic body 1 within the container 29 is heat treated.

Now one example of a process for heat treating in accordance with the present invention a film deposited through an electroless copper plating process including much oxygen as absorbed and adsorbed will be described in detail.

EXAMPLE

A dielectric ceramic body, 10.0 mm in diameter and 0.3 mm thick, was dipped in an electroless copper plating solution, whereby a copper plated film was formed on the whole surface of the ceramic body.

Then the ceramic body was placed in a stainless steel container body and the opening of the container body was closed with a stainless steel lid. The opening of the container body was closed with the lid, without a gap therebetween, to establish a gas tight state. At that time the ceramic bodies filled more than 90% of the volume of the container.

Then the stainless steel container having the ceramic bodies placed therein was placed in a tunnel furnace and was passed therethrough. A nitrogen gas was supplied within the tunnel furnace at the rate of 100 l per minute. The maximum temperature within the tunnel furnace was selected to be the values as shown in the following table and the maximum temperature period was selected to be approximately 10 minutes and the whole heat treating period was selected to be 30 to 60 minutes.

TABLE

| Heat Treating Temperature (°C.) | $\rho(\Omega^{-1} \cdot cm^{-1})$ |
|---|---|
| none | $1.8 \times 10^5$ |
| 400 | $2.1 \times 10^5$ |
| 500 | $4.2 \times 10^5$ |
| 600 | $4.6 \times 10^5$ |
| 700 | $4.8 \times 10^5$ |
| 800~1000 | $5.0 \times 10^5$ |
| (Conductivity of Bulk Pure Copper | $5.8 \times 10^5 \cdot \Omega^{-1} \cdot cm^{-1}$) |

The copper plated film on the dielectric ceramic body after the heat treatment was completed exhibited a pure copper state having a hue of flesh red. The table shows a relation between the heat treating temperature and the conductivity of the copper plated film, wherein it is appreciated that metallization progresses with the temperature of 500° C. as a boundary and the higher the heat treating temperature the better the conductivity of the copper plated film. For temperatures of 800°–1000° C., the conductivity of a copper plated film approaches that of a bulk pure copper electrode. Only for the purpose of reference, the conductivity of a copper plated film which has not been heat treated was shown. Meanwhile, the copper plated film was 10 μm in thickness.

Furthermore the adhesive strength to the surface of the ceramic body after heat treatment of the copper plated film was measured and it was observed that whereas the strength was 300 g/cm² before the heat treatment, an increase of approximately ten times such as the strength of 3 kg/cm² was attained after the heat treatment. The adhesive strength test was done by soldering a lead wire in a vertical direction to the copper plated film on the major surface of the dielectric ceramic bodies and the lead wire was pulled by a pull testing machine, the value when the copper plated film is peeled off being shown.

Furthermore, a dielectric loss after the heat treatment was also measured and it was observed that whereas the dielectric loss was tan δ=1.2% before the heat treatment, a drastic characteristic improvement was attained such as tan δ=0.5% after the heat treatment. This means that a copper film obtained by the inventive process is extremely suited for a capacitor electrode.

Although in the foregoing the example was described with respect to a dielectric ceramic body, the same effect can be attained by applying the present invention to a copper film formed on an insulating material such as alumina, a resistive material, and a semiconductive material besides the above described dielectric material. Furthermore, the present invention is not limited to a copper film formed by an electroless plating process, but the same effect can be attained by a copper film formed by a vacuum evaporation process, a sputtering process, an ion plating process and the like.

Now a method of manufacturing a ceramic capacitor by way of an example of a ceramic electric circuit component to which the inventive method may be applied will be described. The inventive method is applied to a part of the manufacturing process of the ceramic capacitor.

Figure 6:
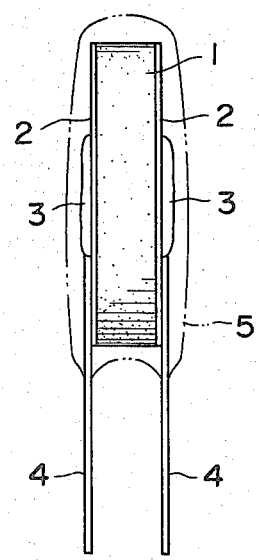
FIG. 6 is a side view showing a ceramic capacitor as an example of a ceramic electric circuit component including a ceramic body.

Referring to FIG. 6, a ceramic capacitor comprises a ceramic body 1 having, for example, a disk shaped appearence. The ceramic body 1 is provided on both major surfaces thereof with electrodes 2 which are opposed to each other. The electrodes 2 are formed of copper films. A lead wire 4 is connected to each electrode 2 by applying a solder 3, respectively. The lead wires 4 are led out in a radial directions. The assembly thus constituted is, as shown by a phantom line, molded with an insulating resin 5. Of course, the lead wires 4 are adapted such that at least the tip portions thereof may be exposed from the insulating resin 5.

Figure 9:
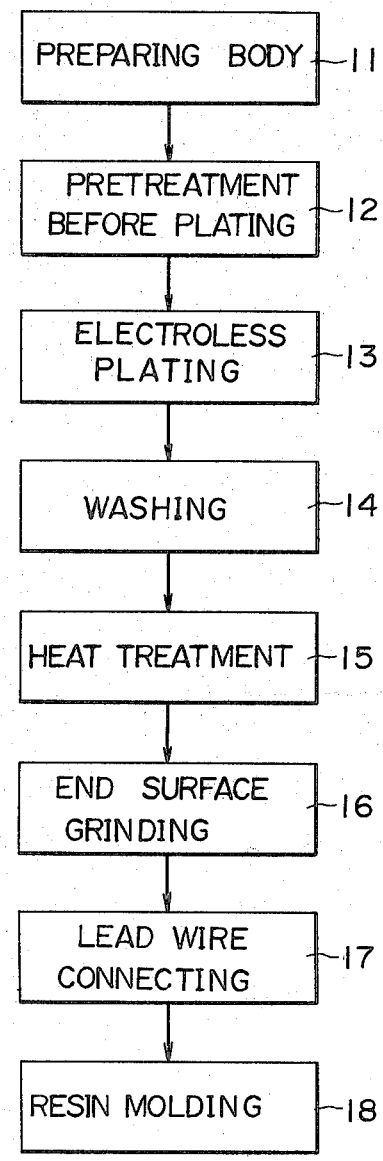
FIG. 9 is a flow diagram showing a manufacturing process of a ceramic capacitor in accordance with one embodiment of the process of the present invention.

One example of the manufacturing process of the FIG. 6 ceramic capacitor is shown in FIG. 9. Referring to FIG. 9, as the first step 11, the ceramic body is prepared. As the second step 12, pretreatments before an electroless plating process are performed. The pretreatments comprise a oil extraction process, an activation process and a washing process. As the third step 13, the surface of the pretreated ceramic body is subjected to a copper electroless plating process, whereby a copper plated film is formed on the whole surface of the ceramic body. As the fourth step 14, the ceramic body having the copper film formed thereon is washed. As the fifth step 15, the copper plated film is heat treated. Accordingly, the copper plated film is changed to a state of metal copper.

Figure 7:
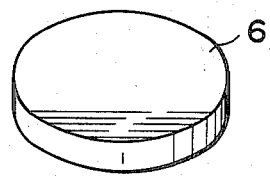
FIG. 7 is perspective view showing a ceramic body having a copper film formed on the whole surface thereof by an electroless plating process.
Figure 8:
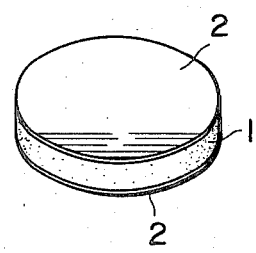
FIG. 8 is a perspective view showing a ceramic capacitor body having opposed electrodes formed by grinding the end surfaces of the ceramic body of FIG. 7.

An intermediate product shown in FIG. 7 is obtained after the fifth step 15 is completed. More specifically, the intermediate product has the copper film 6 formed on the whole surface of the ceramic body. The sixth step 16 (end surface of grinding) is performed so that the copper film 6 formed on the whole surface of the intermediate product may lead to opposing electrodes of a capacitor. FIG. 8 shows the state of the capacitor state after finishing the sixth step 16. More specifically, in the sixth step 16, the outer peripheral end surface of the intermediate shown in FIG. 7 is ground and the ceramic body 1 is exposed in the end surface thereof. As a result, the copper film 6 formed on the whole surface of the ceramic body 1 becomes two electrodes 2 which oppose to each other. The assembly shown in FIG. 8 corresponds to the ceramic body 1 and the opposing electrodes 2 shown in FIG. 6. Then the seventh step 17 and the eighth step 18 are carried out in order, whereby the ceramic capacitor shown in FIG. 6 is obtained.

The copper film thus obtained as the electrodes of the ceramic capacitor exhibits a low resistivity such as $1.72 \times 10^{-6} \Omega.cm$, as compared with a nickel film. Furthermore, the copper film thus obtained exhibits excellent solderability, which does not require soldering on the whole surface of the electrode. As a result, the quantity of flux can be decreased. Since a dipping process in a solder tub is not required, a cause for stress to the ceramic body is eliminated and accordingly very few cracks occur in the ceramic body. Furthermore, adhesion of the copper film to molding resin is excellent and accordingly a capacitor of excellent wetproof characteristic is provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for heat treating a copper film formed on a ceramic body, said apparatus comprising:

a container having a sealed chamber formed therein for receiving at least one ceramic body;

a furnace having an open space for receiving at least one said container;

means for supplying an inert gas to said open space externally of said container whereby a generally inert atmosphere is defined in said open space;

a valve associated with said container for permitting gases located inside said chamber to flow from said chamber into said space whenever the pressure of said gases in said chamber rises above the pressure of said atmmosphere in said space by an amount determined by the structure of said valve;

said furnace including a heater for heating said atmosphere in said space and thereby heating both said gases located in said chamber of said container and any ceramic bodies located in said chamber; and said container and said furnace being so structured that as said atmosphere in said space and said gases in said chamber are heated by said heater, the pressure of said gases in said chamber becomes greater than the pressure of said atmosphere in said space, said heater generating sufficient heat to cause the pressure of said gases in said chamber to rise above the pressure of said atmosphere by at least said amount whereby gases located in said chamber flow outside said chamber into said space and said any ceramic bodies located in said chamber are heat treated without being exposed to said inert gas.

2. An apparatus for heat treating a copper film formed on a ceramic body in accordance with claim 1, wherein said container comprises a container body having an opening defined by the periphery thereof, and a lid being fitted to said periphery of said opening for closing said opening.

3. An apparatus for heat treating a copper film formed on a ceramic body in accordance with claim 2, wherein a gap is formed between the fitting portion of said container body and said lid, said gap defining said valve.

4. An apparatus for heat treating a copper film formed on a ceramic body in accordance with claim 2, wherein:

the fitting portion of said container body and said lid cooperate to establish a gas tight seal; and said valve is formed in a wall of said container and is a one-way valve.

5. An apparatus for heat treating a copper film formed on a ceramic body in accordance with claim 1, wherein said container is made of a member selected from the group consisting of stainless steel, iron, copper, alumina, zirconia, forsterite, quartz glass, glass ceramics, mullite, and cordierite.

6. An apparatus for heat treating a copper film formed on a ceramic body in accordance with claim 1, wherein said furnace comprises a tunnel type continuous heating furnace.

7. An apparatus for heat treating a copper film formed on a ceramic body in accordance with claim 1, wherein said furnace comprises a batch furnace.

* * * * *